United States Patent [19]

Morita et al.

[11] Patent Number: 5,295,553
[45] Date of Patent: Mar. 22, 1994

[54] REAR WHEEL STEERABLE WORKING VEHICLE

[75] Inventors: Shigeru Morita; Yoshihiro Kawahara; Yoshikazu Togoshi; Terutaka Takei, all of Osaka, Japan

[73] Assignee: Kubota Corporation, Osaka, Japan

[21] Appl. No.: 596,136

[22] Filed: Oct. 11, 1990

[30] Foreign Application Priority Data

Apr. 21, 1990 [JP] Japan .................. 2-105620

[51] Int. Cl.⁵ .................................. B60K 17/30
[52] U.S. Cl. ............................. 180/212; 180/215; 180/252
[58] Field of Search ............... 180/252, 143, 161, 211, 180/212, 140, 210, 234, 237, 238, 215; 280/91, 89, 271, 272, 92

[56] References Cited

U.S. PATENT DOCUMENTS

| | | | |
|---|---|---|---|
| 565,718 | 8/1896 | Boardman | 280/271 |
| 3,539,195 | 11/1970 | Swanson et al. | 280/92 |
| 4,157,125 | 6/1979 | Bushell et al. | 180/212 |
| 4,369,855 | 1/1983 | Buschbom et al. | 180/212 |
| 4,572,316 | 2/1986 | Kanazawa et al. | 180/143 |
| 4,597,462 | 7/1986 | Sano et al. | 180/143 X |
| 4,674,761 | 6/1987 | Kassai | 280/271 |
| 4,697,816 | 10/1987 | Kawamoto et al. | 180/143 X |
| 4,887,686 | 12/1989 | Takei et al. | 180/252 X |
| 4,986,387 | 1/1991 | Thompson | 180/212 |
| 5,099,939 | 3/1992 | Elser et al. | 280/91 |

FOREIGN PATENT DOCUMENTS

| 3035004 | 4/1982 | Fed. Rep. of Germany | 180/252 |
|---|---|---|---|
| 2-42911 | 2/1990 | Japan . | |

Primary Examiner—Margaret A. Focarino
Assistant Examiner—Ann Boehler
Attorney, Agent, or Firm—Jordan and Hamburg

[57] ABSTRACT

A working vehicle comprises front wheels, steerable rear wheels steerable up to a minimum radius turning region lying in a transverse direction substantially perpendicular to a longitudinal direction of a vehicle body, and a rear wheel control device for steering the rear wheels. A restraining device is provided for preventing the rear wheels from being steered to the minimum radius turning region by the rear wheel control device.

7 Claims, 4 Drawing Sheets

1

REAR WHEEL STEERABLE WORKING VEHICLE

BACKGROUND OF THE INVENTION

1. Field of the Invention

The present invention relates to a riding type working vehicle in which front and rear wheels are propelled and the rear wheels are steered.

2. Description of the Prior Art

A riding type mower as an example of such working vehicles is shown in Japanese patent application "Kokai" No. 2-42911. This publication discloses a right and left pair of rear wheels steerable about a single vertical axis. In this structure, when the rear wheels are steered right or left substantially perpendicular to a longitudinal center of a mower body, a minimum radius turn can be realized around a point in the vicinity of the middle between the right and left front wheels.

However, when such minimum radius turn is carried out on a slope with a rear portion of the mower body moving downwardly of the slope, the mower body is turned around with a minimum radius at high speed due to turning of the rear wheels and weight of the rear portion of the mower body, which causes a problem of operational efficiency.

SUMMARY OF THE INVENTION

An object of the present invention is to provide an improved rear wheel steerable type working vehicle which guarantees a high degree of safety without deteriorating its operational efficiency regardless of ground conditions.

The above noted object is achieved by a working vehicle comprising front wheels, steerable rear wheels steerable up to a minimum radius turning region lying in a transverse direction substantially perpendicular to a longitudinal direction of a vehicle body, rear wheel control means for responding to steering of the rear wheels, and restraining means for restraining the rear wheel control means thereby to prevent the rear wheels from being steered to the minimum radius turning region.

With such structure, when the vehicle is entering a slope or the like, the restraining means is operable to prevent the rear wheels from being steered to the minimum radius turning region. As a result, such a situation does not occur as the minimum radius turn is carried out at high speed on the slope.

In addition, the working vehicles including a four wheel drive mower or the like generally travel on a road with only the front wheels being driven while traveling a working field with both of the front and rear wheels being driven. It should be noted that, when the aforementioned minimum radius turn is effected with the front and rear wheels being driven, the driven front wheels impart a resistance to the minimum radius turn as well as mar the working field. In avoiding such a situation, a preferred embodiment of the present invention is advantageous in that a propelling transmission device is structured so as to break the transmission of drive to the front wheels while the rear wheels are steered to the minimum radius turning region. Thus, the minimum radius turn is effected with the drive transmission to the front wheels being broken to freely rotate the front wheels, as a result of which the front wheels do not impart resistance to the minimum radius turn or mar the working area.

As discussed above, the minimum radius turn can be prevented in advance when the vehicle is on the slope or the like, which improves the operational efficiency of the working vehicle and the resulting safety.

Further, the four wheel drive vehicle can effect a smooth minimum radius turn without devastating the working field by providing means for automatically switching to a condition in which only the rear wheels are driven at the time of minimum radius turn. Consequently, turning performance can be improved.

Other features and advantages of the invention will be apparent from the following description.

BRIEF DESCRIPTION OF THE DRAWINGS

The accompanying drawings show embodiments relating to the present invention in which.

DESCRIPTION OF THE PREFERRED EMBODIMENTS

The present invention will be described hereinafter with reference to the accompanying drawings.

Figure 1:
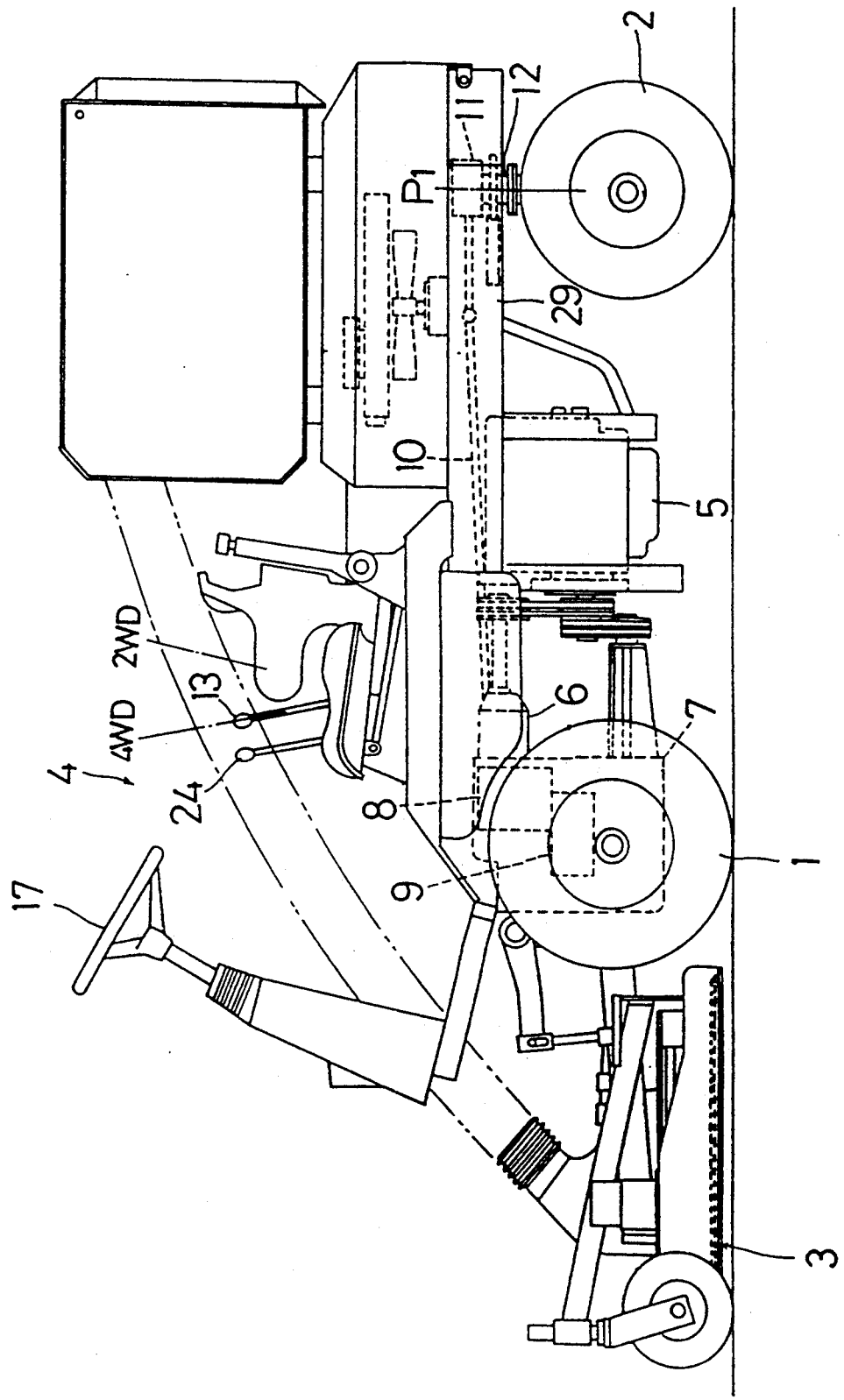
FIG. 1 is a side view of a riding type mower.

FIG. 1 shows a riding type mower as an example of working vehicles, comprising front wheels 1, rear wheels 2, a mower body supported by the front and rear wheels, a cutting unit 3 mounted on a front portion of the mower body, and a driver's section 4 mounted on a middle portion of the mower body.

Drive from an engine 5 is transmitted to a hydrostatic stepless change speed device 6 and a drive distributor 8 housed in a transmission case 7. The drive is distributed from the drive distributor 8 to the right and left front wheels 1 through a front wheel clutch 9. The drive branched out from the drive distributor 8 is transmitted to the rear wheels 2 through a transmission shaft 10 and a bevel gear mechanism 11.

The front wheels 1 are only drivable, and not steerable. The rear wheels 2 are provided in a right and left pair below and supported by a support frame 12 pivotable about a vertical axis P1. The distance between the right and left rear wheels 2 is significantly smaller than the distance between the right and left front wheels 1.

The drive distributor 8 is switchable between a four wheel drive mode (4WD) whereby the drive is a front two wheel drive mode (2WD) whereby the drive transmitted only to the front wheels 1, and is a first control lever 13 is provided for switching the drive distributor 8. In this case, the four wheel drive mode (4WD) is selected in a working field, and the front two wheel drive mode (2WD) is selected for traveling on the road.

Figure 2:
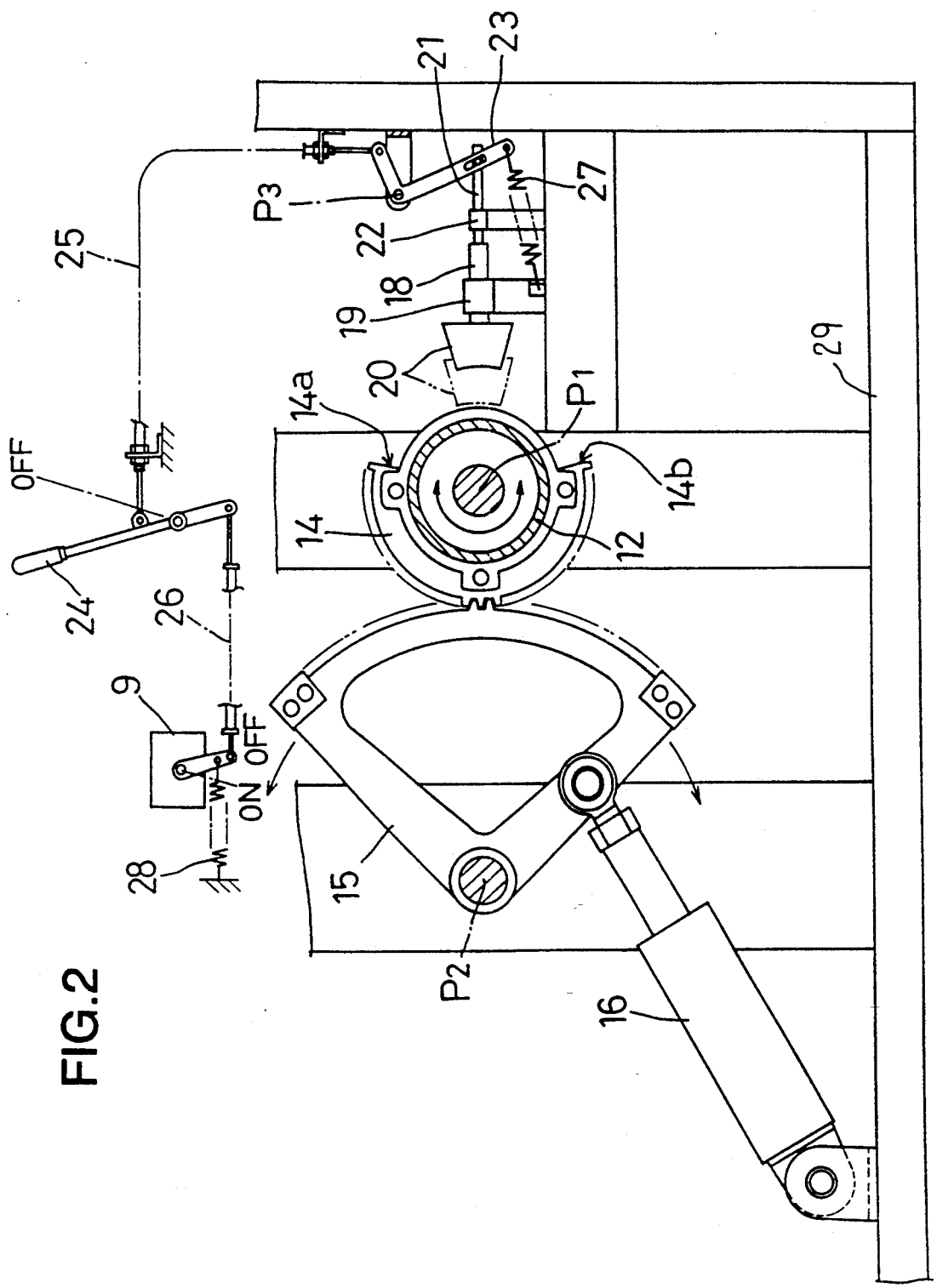
FIG. 2 is a top plan view showing a steering structure and a restraining structure for rear wheels.

A steering control structure for the rear wheels 2 will be set forth below. As shown in FIG. 2, a first member of the steering control structure, namely segment gear 14 is fixed to the support frame 12 which supports the rear wheels 2, and a second segment gear 15 supported by a mower frame 29 is meshed with the first gear 14 to be swingable about a vertical axis P2. A hydraulic cylinder 16 extends between the second gear 15 and the mower frame 29.

Figure 4:
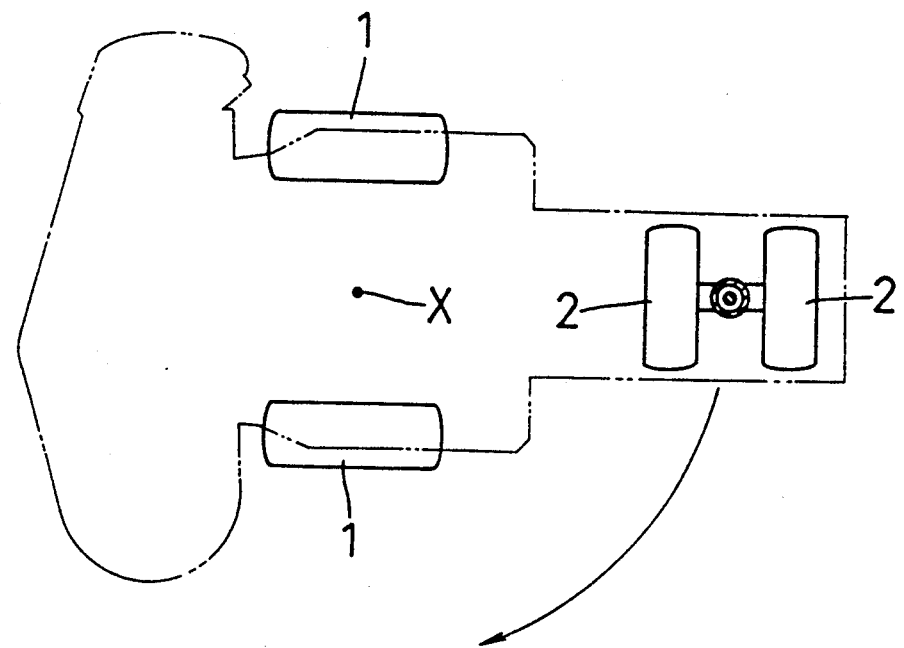
FIG. 4 is a schematic plan view showing a minimum radius turning condition of a mower body.

With the above-noted structure, the hydraulic cylinder 16 is extendible and contractible by controlling a steering wheel 17 of the driver's section 4 whereby the rear wheels 2 are steered about the vertical axis P1 through the first and second gears 14 and 15. When the hydraulic cylinder 16 is extended or contracted up to a stroke end thereof, the rear wheels 2 are steered to a region for minimum turning in which the rear wheels are turned in a transverse direction substantially perpendicular to a longitudinal direction of the mower body, as seen from FIG. 4.

A structure for switching to a condition which does not allow the rear wheels 2 to be steered to the minimum turning region will be described next.

Figure 3:
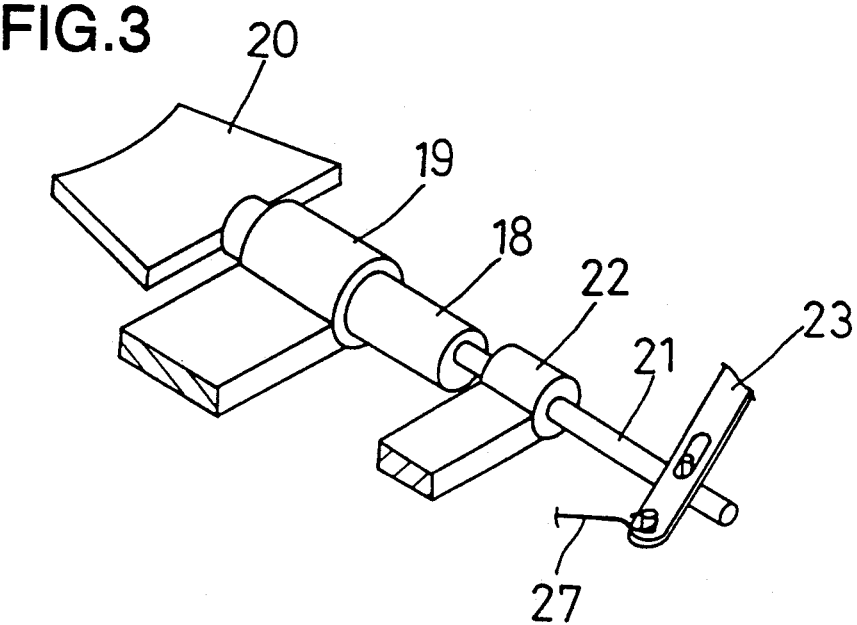
FIG. 3 is a perspective view showing a structure around a restraining member.

As shown in FIGS. 2 and 3, a round support rod 18 is slidably supported in a boss portion 19 having a round bore, and a plate-like trapezoidal restraining member 20 is fixed to an end of the support rod 18.

A control rod 21 is fixed to a rear end of the support rod 18 at a position eccentric from the center of the support rod 18, and is slidably supported in a boss portion 22. Thus, the control rod 21 is adapted to push and pull the support rod 18 and lock the support rod 18 against rotation.

A bell crank 23 is pivotable about a vertical axis P3 of the mower frame 29 and has one end engaging a rear end portion of the control rod 21. The bell crank 23 is also connected to a second control lever 24 at the driver's section 4 through a wire 25. Further, the second lever 24 is also connected to the front wheel clutch 9 through a wire 26.

FIG. 2 shows a condition in which the first lever 13 is operated to the four wheel drive mode (4 WD) and the second lever 24 is operated to a restraint releasing position (ON). This results in the restraining member 20 being positioned away from the first gear 14, which allows the rear wheels 2 to be steered to the minimum turning region, with the front wheel clutch 9 disengaged, thereby to drive only the rear wheels 2.

When the second lever 24 is operated to a restraining position (OFF) from the condition of FIG. 2, the restraining member 20 is moved to the left (corresponding to a restraining) through the bell crank 23 under the urging force of a spring 27, and the front wheel clutch 9 is engaged under the urging force of a spring 28 to realize the four wheel drive mode. The first gear 14 is cut so as to form a transversely symmetric configuration and defines right and left contact portions 14a and 14b. More particularly, a partial annular space, i.e. a space having a center angle of approximately 180° with respect to a center axis P1 is defined between the right and left contact portions in an outer peripheral region of the first gear 14. The restraining member is movable into a middle portion of the space. In such structure, one of the contact portions 14a and 14b contacts the restraining member 20 as the rear wheels 2 are steered by approximately 60° to the right or the left from a straight running position thereby to prevent the rear wheels from being steered any further.

Figure 5:
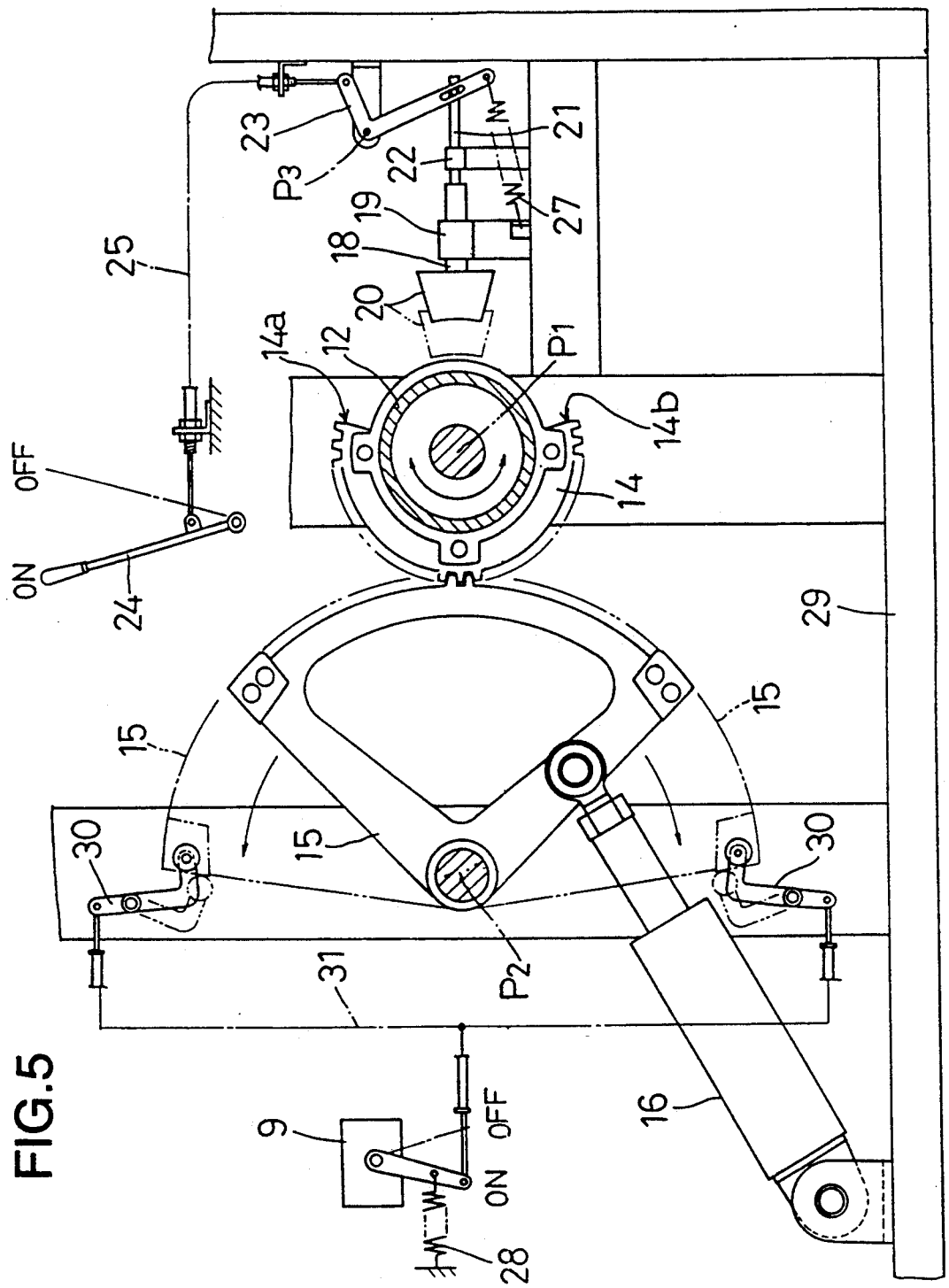
FIG. 5 is a top plan view showing a steering structure and a restraining structure for the rear wheels according to another embodiment.

FIG. 5 shows another embodiment according to the present invention in which a pair of pivotal control arms 30 may be mounted on laterally opposite sides of the mower frame 29 and connected to the front wheel clutch 9 through a wire 31. When the rear wheels 2 are steered up to the minimum turning region while traveling in the four wheel drive mode (4 WD), one end of the second gear 15 pushes one of the control arms 30 to disengage the front wheel clutch 9.

According to the foregoing embodiments, the restraining member 20 is manually slidably operated, but may be automatically slidably operated by means of an actuator when a inclination sensor mounted on the mower body detects an inclination angle of the mower exceeding a predetermined angle.

What is claimed is:

1. A working vehicle comprising:
   drivable, non-steerable front wheels,
   drivable rear wheels, said rear wheels being steerable up to a minimum radius turning region lying in a transverse direction substantially perpendicular to a longitudinal direction of a vehicle body,
   rear wheel control means for responding to steering of the rear wheels, the rear wheel control means including a pivotable member which pivots in proportion to an angle in which the rear wheels are being steered, said pivotable member being pivotable along a pivotal locus area corresponding to the minimum radius turning region of the rear wheels and having defined therein an engaging portion,
   restraining means for restraining the rear wheel control means, said restraining means including a restraining member movable into said pivotal locus area to engage said engaging portion to thereby prevent the rear wheels from being steered to the minimum radius region,
   means for remotely operating the restraining means, and
   a propelling transmission device for preventing transmission of driving force to the front wheels while the rear wheels are steered to the minimum radius turning region.

2. A working vehicle as claimed in claim 1 wherein the restraining means includes a control lever for moving the restraining member, the propelling transmission device comprises a front wheel transmission clutch, the control lever being operatively connected to the front wheel transmission clutch for moving the restraining member out of said pivotal locus area and simultaneously disengaging the front wheel transmission clutch.

3. A working vehicle comprising:
   a vehicle body,
   front wheels, steerable rear wheels steerable up to a minimum radius turn region lying in a transverse direction substantially perpendicular to a longitudinal direction of the vehicle body, said front and rear wheels supporting the vehicle body,
   a steering wheel for steering the rear wheels,
   rear wheel control means operatively connected at one end thereof to said steering wheel and at the other end thereof to said rear wheels, said rear wheel control means including a pivotable member which pivots in response to a steering angle of the steering wheel, said pivotable member being pivotable along a pivotal locus area corresponding to the minimum turn radius region of the rear wheels,
   an engaging portion defined in the pivotable member, and
   restraining means mounted on the vehicle body and having a restraining member enterable into said pivotal locus area to engage said engaging portion of said pivotable member to prevent the rear wheels from being further steered to the minimum radius turn region along the pivotal locus area.

4. A working vehicle as claimed in claim 3 wherein the engaging portion comprises a pair of contact faces defined in outer peripheries of the pivotable member, and wherein the restraining member engages said engaging portion by moving into a middle portion of a circumferential angle with respect to the pivotal axis of a partial annular space defined between the contact faces.

5. A working vehicle as claimed in claim 3 further comprising a control member for manually controlling entrance of the restraining member into the pivotal locus area.

6. A working vehicle as claimed in claim 5 further comprising urging means for urging said control member toward a directional for causing the restraining member to enter the pivotal locus area.

7. A working vehicle as claimed in claim 3 rear wheels are pivotable about a single vertical pivotal axis, and wherein said pivotable member is pivotable about said vertical pivotal axis.

* * * * *